F. HANUSCH.
FOOD CUTTER.
APPLICATION FILED JUNE 27, 1917.
1,251,885.
Patented Jan. 1, 1918.
3 SHEETS—SHEET 3.
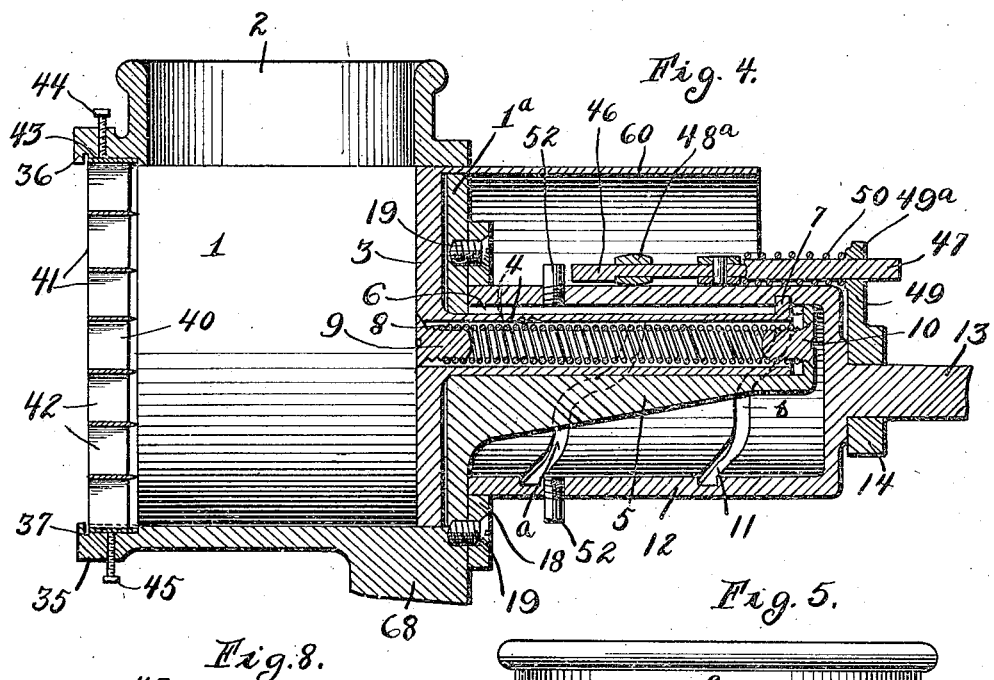
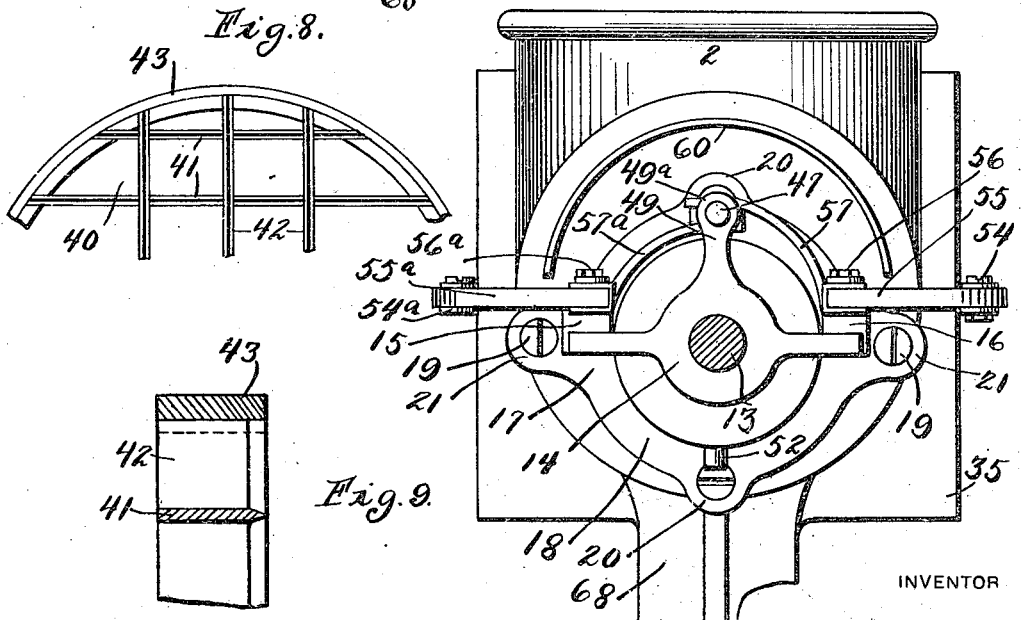
WITNESSES
Arthur K. Moore
Jd. H. Babcock
INVENTOR
Frederick Hanusch
BY Richard Owen
ATTORNEY

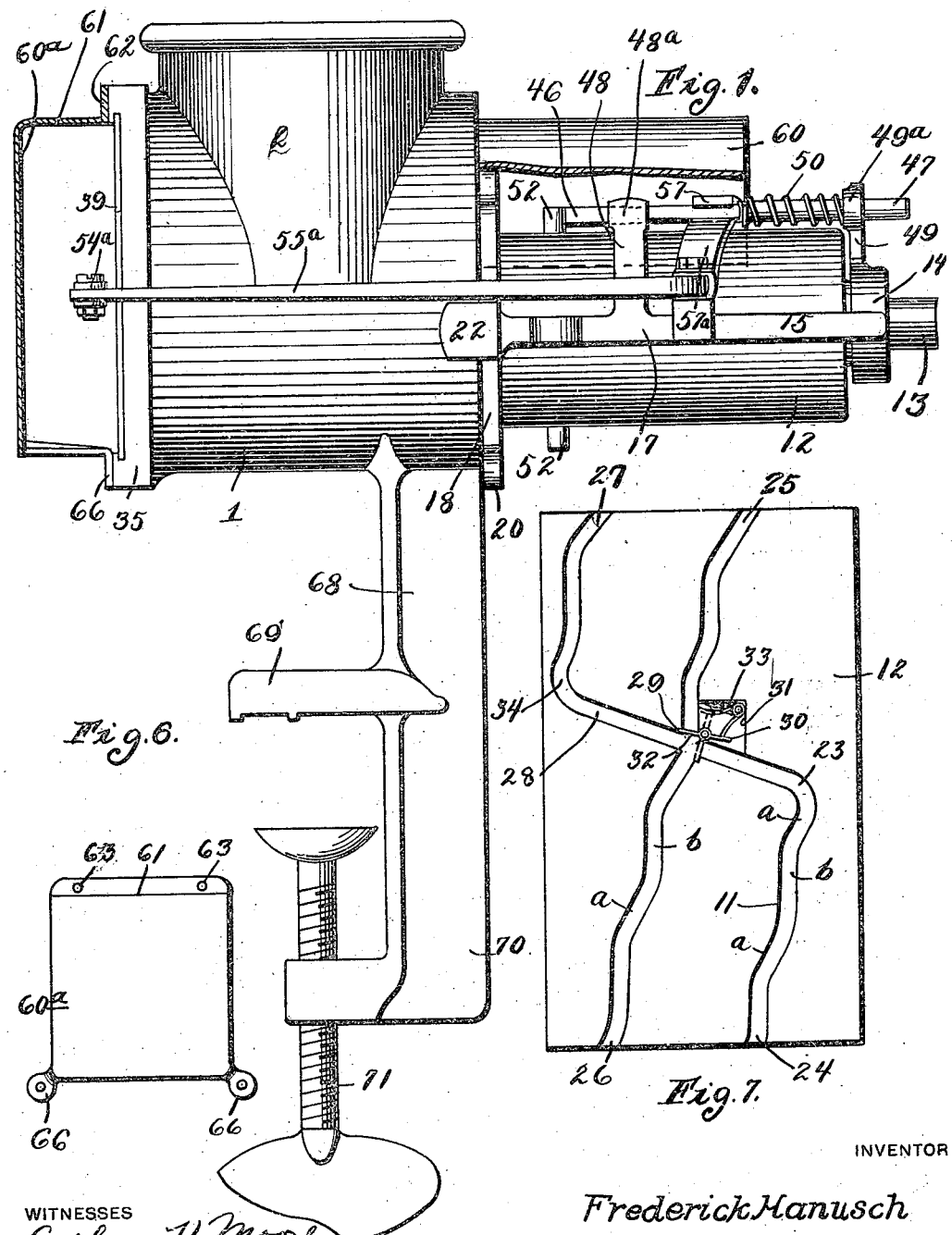

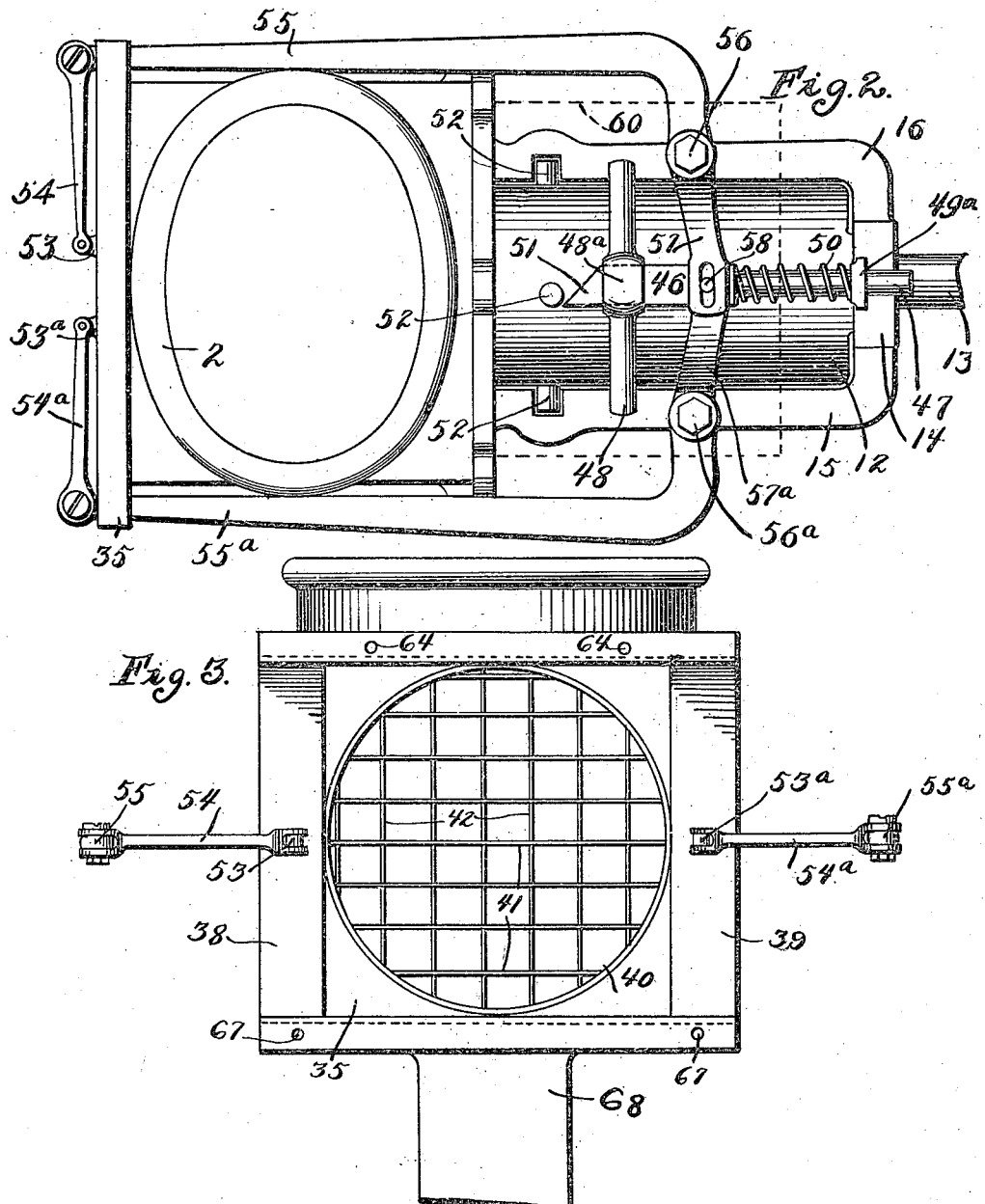

UNITED STATES PATENT OFFICE.

FREDERICK HANUSCH, OF GRASSTREE, QUEENSLAND, AUSTRALIA.

FOOD-CUTTER.

1,251,885.  Specification of Letters Patent.  Patented Jan. 1, 1918.

Application filed June 27, 1917. Serial No. 177,356.

*To all whom it may concern:*

Be it known that I, FREDERICK HANUSCH, a subject of the King of Great Britain, residing at Grasstree, in the State of Queensland and Commonwealth of Australia, have invented certain new and useful Improvements in Food-Cutters, of which the following is a specification.

This invention relates to food cutters, and more particularly to a cutter especially adapted for dicing fruit, vegetables, and similar articles of food for preserving and similar purposes.

One of the main objects of the invention is to provide a cutter of the character stated of simple construction and operation which consists of a minimum of parts. A further object is to provide a cutter having a cylindrical food receiving casing and a press head mounted in this casing for movement axially of the same, means being provided for imparting intermittent forward movement to this head. Another object is to provide a cutter of the character stated which may be continuously operated, means being provided for automatically returning the press head to its innermost or initial position after it has been moved into its most forward position. A still further object is to provide a cutter having a cutting grid at its front end whereby the material being cut is divided into a plurality of parallel columns, cutting blades being mounted on the outer face of this grid for reciprocation transversely of the same whereby the material which is forced through the grid is severed in the form of blocks or cubes. Further objects will appear from the detailed description.

In the drawings:—

Figure 1 is a side view of a cutter constructed in accordance with my invention, partly broken away for the sake of clearness;

Fig. 2 is a top plan view of the same certain parts being omitted;

Fig. 3 is a front view with the front cover plate removed;

Fig. 4 is a central longitudinal vertical section with the front cover plate and the cutting blades omitted;

Fig. 5 is a back view;

Fig. 6 is a detail of the front cover plate;

Fig. 7 is a view of the sleeve for operating the cutting blades and head considered as cut longitudinally and flattened out, to show the arrangement of the operating groove; and Figs. 8 and 9 are fragmentary detail views of the cutting grid.

The cutter is provided with a cylindrical body or food receiving casing 1 with which communicates the mouth or feeding hopper 2. A press head 3 is mounted in the casing 1 and is movable axially of the same. This press head is in the form of a disk which fits snugly the cylindrical interior of casing 1 so as to effect a snug closure therewith. The head 3 is provided with a central outwardly extending tubular neck 4 which is slidable in a supporting arm 5 formed integral with, and extending rearwardly from, the casing 1. Arm 5 is provided at its top with a longitudinally extending slot 6 which slidably receives a lug 7 extending radially from the neck 4 of the head, at the outer end thereof. A tension coil spring 8 is mounted within neck 4 and is secured at its inner end to the center of head 3 by means of a screw 9 threaded into the spring. The outer end of this spring is similarly secured to the outer end of arm 5 by means of a screw 10. This spring acts by tension to force the head 3 rearward so as to return it to its initial position when the head has been moved into its most forward position.

The lug 7 of neck 4 engages loosely into an operating groove 11 formed in the inner face of a sleeve 12 which is rotatably mounted on the back of casing 1 about arm 5. This sleeve is provided at its outer end with an integral stub shaft 13 which is rotatably supported by a collar 14 formed integral with the side arms 15 and 16 of a supporting frame 17 secured to the back wall 1ª of casing 1. This frame is provided at its inner end with an integral ring 18 which is secured to the back wall of the casing by the screws 19 inserted through lugs 20 and 21 formed integral with the ring. Each lug 21 is provided with an integral ear 22 which fits snugly about the side of casing 1 thus serving to center the frame on the casing. The interior diameter of ring 18 is such as to snugly receive the inner end of sleeve 12 thus forming a bearing member and support for the same. By this means the sleeve is mounted for rotation about supporting arm 5 and is maintained in proper relation to this arm and neck 4 of head 3. The stub shaft 13 of sleeve 12 is adapted to receive an operating crank, or a drive gear may be secured on this shaft and rotated by any suitable means, such as a second gear meshing therewith.

The particular design and operation of groove 11 of sleeve 12 will be more clearly understood by referring to Figs. 4 and 7 of the drawings, particularly the latter. From Fig. 7 it will be noted that the groove is of undulating configuration for the greater portion of its length, being provided with a series of inclined portions or steps which are disposed at an angle across the axis of the sleeve so as to be inclined longitudinally of the same. These steps are connected by intermediate straight portions $b$ which are disposed at right angles to the axis of the sleeve, these portions $b$ and the steps $a$ forming a groove of irregular or undulatory outline. In Fig. 4 of the drawings it is assumed that the lug 7 is at approximately the point 23 of groove 11. If the sleeve 12 is rotated in a counter-clockwise direction, the lug 7 will be engaged by the first step $a$ of the groove so as to force the head 3 inward a short distance. The lug will then be engaged by the contiguous straight portion $b$ so that, the head will remain stationary until lug 7 is again engaged by the succeeding step $a$ when it will again be moved forward a short distance. As the sleeve is rotated this operation continues, the head 3 being intermittently forced forward in the casing 1. When the flat blank shown in Fig. 7 is bent into proper shape to form the sleeve 12, the point 24 of the groove registers with the point 25, and point 26 registers with point 27, thus forming a continuous helical groove, this groove being provided with a straight portion 28 which extends substantially the full length of the sleeve and crosses the body portion of the groove at 29. A valve plate 30 is rockably mounted at the intersection of the straight portion 28 with the body of the groove in a suitable recess 31. This plate is pivoted intermediate its ends to provide an inner arm and an outer arm. The outer arm 32 of plate 30 is of slightly greater length than the width of groove 11, and this plate is normally held in parallelism with the straight portion 28 of the groove so as to close the undulatory or body portion of the groove at 29. For this purpose a suitable wire spring 33 is mounted in the recess 31 and bears against the inner arm of the plate, the wall of the groove being recessed to receive the end portion of arm 32 of this plate so that the arm forms practically a continuation of this wall. As the sleeve is rotated, the lug 7 will be engaged by the various steps of the groove until it reaches the point of intersection 29 of the straight portion and the undulatory portion of the groove. At this point, the arm 32 of plate 30 will engage lug 7 and, as the sleeve is rotated, the plate will be rocked outward so as to close the straight portion 28 of the groove and direct the lug 7 into the second undulatory portion of the groove, as indicated in dotted lines in Fig. 7. After this, the rotation of sleeve 12 will bring points 26 and 27 of the groove into engagement with the lug 7. When the press head 3 has reached its innermost, or most forward position, the lug 7 will be at point 34, that is, at the forward end of the straight portion 28 of the operating groove. As soon as the sleeve has been turned so as to bring the lug into this position, a straight path from point 34 to the point of starting 23 is provided for the lug, and the tension spring 8 acts to immediately return the head 3 to its initial position as the sleeve is rotated, after which the operation above described will be repeated, two complete rotations of the sleeve 12 serving to complete a cycle of operation.

The casing 1 is provided, at the front end thereof, with an integral rectangular plate 35. This plate has an upper depending flange 36 and a lower upwardly extending flange 37, these two flanges being spaced a short distance from the body of the plate to provide upper and lower guide grooves which slidably receive the end portion of the vertically extending cutting blades 38 and 39, these blades being positioned at each side of plate 35 and reciprocable transversely of the same. A circular cutting grid 40 is secured in the front of casing 1, the outer face of this grid being flush with the outer face of plate 35. This grid is composed of a plurality of cutting members 41 which are mounted in horizontal spaced relation, and a plurality of similar members 42 which are disposed vertically, these members 41 and 42 being secured in a circular frame or ring 43 which fits snugly in a rabbet provided adjacent the outer end of casing 1, being removably secured in position by set screws 44 and 45. The ring 43 corresponds in thickness to the depth of the rabbet so as to bring its inner face flush with the inner face of casing 1. When the head 3 is forced forward a predetermined distance the food in casing 1 will be forced through the cutting grid 40 a corresponding distance so as to be separated into a plurality of parallel rods or columns of approximately square cross section. The food which projects beyond the grid is then severed by means of the cutting blades 38 and 39 which are moved inward across the grid 40 by means to be later disclosed. By this construction fruits, and vegetables may be quickly and easily diced for preserving and other purposes. By removing the grid 40 this cutter may also be utilized as a slicing machine, the opposite movement of blades 38 and 39 serving to cut or slice the food and preventing lateral displacement of the same in casing 1.

Each of the cutting blades 38 and 39 is operatively connected to a bolt 46 which is reciprocably mounted through a supporting collar 48$^a$ carried by an arched yoke 48 extending upward from the arms 15 and 16 of supporting frame 17 about sleeve 12. Bolt 46 is provided with an outwardly extending reduced stem 47 which is slidable through a ring 49$^a$ carried by a finger 49 extending upward from collar 14 of the supporting frame. A coiled expansion spring 50 is mounted about stem 47 and is confined between the head 46 and ring 49$^a$. The inner end of head 46 is beveled as at 51 for engagement by the radially projecting pins 52 secured in sleeve 12 a short distance from the inner end thereof. As the sleeve 12 is rotated the pins 52 engage the inclined inner end of head 46 and force the same rearward of casing 1. When the pin 52 passes out of engagement with the head, expansion spring 50 acts to return the head to its initial position.

Cutting blade 38 is provided with a central lug 53. This lug is pivotally secured in the bifurcated inner end of a link 54, the outer end of which is secured pivotally to the forward end of arm 55 of a bell crank lever which is pivotally secured by a pivot bolt 56 to arm 16 of supporting frame 17. This lever is provided with an integral arcuate arm 57 which passes about the upper portion of sleeve 12 and over the bolt head 46. This arm 57 is provided, at its inner end, with a slot which receives a pin 58 secured through head 46. The cutting blade 39 is similarly connected to bolt head 46 by means of a lug 53$^a$, link 54$^a$, arm 55$^a$ of a bell crank lever, and arm 57$^a$ and pivot bolt 56$^a$, the pin 58 being of such length as to extend above and below the bolt head 46 and project through the slots in arms 57 and 57$^a$. By this construction, when the bolt 46 is forced outward by means of the pins 52, the inner ends of arms 57 and 57$^a$ will be moved outward so as to move the arms 55 and 55$^a$ inward thus moving the cutting blades 38 and 39 toward each other. The arms 55 and 55$^a$ and 57 and 57$^a$ are of such relative lengths that the cutting blades will be moved inward in opposite directions to the center of casing 1 without actually coming into contact with each other, thus insuring that all food which has been forced through the cutting grid will be cut off or severed from the food remaining within the food receiving casing. It will be understood, of course, that the side arms 15 and 16 of the supporting frame 17 are provided with suitable cutouts or recesses to accommodate the pins 52.

The head 3 is provided, at its upper portion, with an integral rearwardly extending guard plate 60. This plate extends rearwardly of the head and is of substantially smi-circular shape in transverse cross section, the back wall 1$^a$ of casing 1 being provided with a suitable arcuate slot to accommodate this guard plate. This plate serves to effectually prevent all entry of food from the feed hopper 2 behind the press plate or head 3 when it is moved forward in the casing. By providing this guard plate all necessity of discontinuing feeding of the food to the cutter during the forward movement of the head is eliminated, thus permitting continuous operation of the machine.

A suitable cover or guard plate 60$^a$ is secured to the front plate 35 of casing 1. This cover plate is of rectangular cross section being provided, at its upper end, with the horizontal wall 61 and the integral vertical flange 62, this flange being provided with suitable openings 63 for receiving securing screws threaded into the bores 64 in the top of plate 35. The cover-plate 60$^a$ is further provided, at each lower corner, with an offset lug 66 having an aperture for receiving a securing screw which is threaded into the bores 67 in the lower bar of plate 35. This cover serves as a guard for the cutting grid 40 and the blades 38 and 39, and the front wall of this plate is spaced a sufficient distance in front of these members to permit proper operation of the same. The diced food, as it is severed by the blades 38 and 39, will drop through the opening at the bottom of cover plate 60 and may be received by any suitable receptacle placed beneath the same.

This cutter may be secured to the edge of a table or other suitable support in the same manner as cutters of standard construction, for which purpose it is provided with the integral standards 68 having the rectangularly disposed gripping arm 69 which is placed above a sleeve 70 through which is threaded the usual gripping screw 71. When thus secured in position the cutter may be operated manually by means of a crank arm secured on the stub shaft 13 of sleeve 12, or by any other suitable means.

As will be noted from Figs. 1, 2, and 7 of the drawings, the operating sleeve 12 is provided with four radially disposed equally spaced pins 52. As above explained, two complete rotations of the sleeve 12 completes a cycle of operation of the machine. The operating groove 11 is provided with eight inclined portions or steps $a$ so that the head 3 will be moved forward intermittently through eight equal spaces. During the movement of the head from its innermost position into its most forward or outermost position, the sleeve 12 will be moved through two complete rotations so that the cutting plates 38 and 39 will be reciprocated eight times, the reciprocations of these plates alternating with the forward movements of the head 3. By this means, the food to be diced is first forced through the grid 40 so as to be divided into a plurality of parallel columns of substantially square cross section, the forward movement of this food is then stopped and the cutting blades 38 and 39 are reciprocated across the outer face of grid 40 so as to cut off the food projecting beyond the grid, after which the cutting blades are returned to their initial positions and the head again moved forward so as to again force the food through the grid for a predetermined distance. As above pointed out, this operation is continuous, the food being diced or cut into small cubes well adapted for cooking, preserving, and other purposes.

I have shown and described the operating groove 11 of sleeve 12 so positioned as to operate the head 3 when the sleeve is rotated toward the left or in a counter-clockwise direction. It will be evident that, if desired, the position of this groove in the sleeve can be reversed so as to permit rotation of the operating sleeve toward the right or in a clockwise direction so that this sleeve can be radially rotated directly by an operating crank secured on the stub shaft 13, in the usual manner.

What I claim is:—

1. In food cutters, a receiving casing, a head mounted in the casing and movable axially of the same, a sleeve rotatably mounted on the casing, connections between the sleeve and head for imparting intermittent forward movement to said head when the sleeve is rotated, oppositely movable cutting blades slidably mounted on the front of the casing for reciprocation transversely of the same, and means for reciprocating said blades after each forward movement of the head when said sleeve is rotated.

2. In food cutters, a receiving casing, a head mounted in the casing and movable axially of the same, a sleeve rotatably mounted on the casing, connections between the sleeve and head for imparting intermittent forward movement to said head when the sleeve is rotated, oppositely movable cutting blades slidably mounted on the front of the casing for reciprocation transversely of the same, and means actuated by the sleeve for reciprocating said blades after each forward movement of the head when said sleeve is rotated.

3. In food cutters, a receiving casing, a head mounted in the casing and movable axially of the same, means for imparting intermittent forward movement to said head, oppositely movable cutting blades slidably mounted at the front of the casing for movement across the same, means for reciprocating said blades after each forward movement of the head, and means for returning the head to its initial position when said head has been moved into its most forward position.

4. In food cutters, a receiving casing, a head mounted in the casing and movable axially of the same, a sleeve rotatably mounted on the casing, connections between the head and sleeve for imparting intermittent forward movement to the head and for permitting return of the head to its innermost position when the sleeve is rotated, means for returning the head to its innermost position when it has been moved into its extreme forward position, cutting blades reciprocably mounted at the front of the casing, and means for reciprocating said blades after each forward movement of the head.

5. In food cutters, a receiving casing, a head mounted in the casing and movable axially of the same, a sleeve rotatably mounted on the casing and provided in its inner face with a continuous helical groove, said head being provided with a neck extending into the sleeve and having an integral lug fitting into the groove, said groove having a straight portion so disposed as to permit return of the head to its innermost position when said head has been moved into its most forward position, oppositely movable cutting blades mounted at each side of the front of the casing for movement transversely of the same, means for reciprocating said blades when the sleeve is rotated, and means for returning the head to its initial position.

6. In food cutters, a receiving casing, a head mounted in the casing and movable axially of the same, a sleeve rotatably mounted on the casing and provided in its inner face with a continuous helical groove, said head being provided with a tubular neck extending into the sleeve and having an integral lug fitting into the groove, said groove having a straight portion so disposed as to permit return of the head to its innermost position when said head has been moved into its most forward position, oppositely movable cutting blades mounted at each side of the front of the casing for movement transversely of the same, means for reciprocating said blades when the sleeve is rotated, and a tension spring mounted in the neck of said head and secured at one end to the head and at the other end to the casing for returning said head to its initial position.

7. In food cutters, a receiving casing having a rearwardly extending tubular arm provided at its top with a longitudinal slot, a head mounted in the casing and movable axially of the same provided with a tubular neck operable in said arm, said neck being provided with a lug projecting through the slot of said arm, a sleeve rotatably mounted on said casing about said arm and provided with a helical groove of undulating configuration which receives the lug of said neck for imparting intermittent forward movement to the head when the sleeve is rotated, said groove having a straight portion crossing the body of the groove and so disposed as to permit return of the head to its initial position when said head has been moved into its most forward position, means for preventing return of the head previous to its reaching its most forward position, a tension spring mounted in the tubular neck of said head and secured at one end to the head and at the other end to the outer end of said arm of the casing for returning the head to its initial position, cutting means mounted at the front of said casing, and means for operating said cutting means after each forward movement of the head when said sleeve is rotated.

8. In food cutters, a receiving casing having a rearwardly extending tubular arm provided with a longitudinal slot, a head mounted in the casing and movable axially of the same provided with a tubular neck operable in said arm and a guard plate extending rearwardly of the head from the upper portion thereof, said casing being provided with an arcuate slot through its back wall to accommodate said plate, said neck being provided with a lug projecting through the slot of said arm, a sleeve rotatably mounted on the casing about the arm and provided with a helical groove of undulating configuration which receives the lug of said neck for imparting intermittent forward movement to the head when the sleeve is rotated, said groove having a straight portion intersecting the body of the groove and so disposed as to permit return of the head to its initial position when said head has been moved into its most forward position, means for preventing return of the head previous to its reaching its most forward position, a tension spring mounted in the tubular neck of said head and secured at one end to the head and at the other end to the outer end of said arm of the casing for returning the head to its initial position, a cutting grid secured in the front of the casing, cutting blades mounted in front of said grid at each side of the casing for reciprocation transversely of the same, and means for reciprocating said blades after each forward movement of the head.

9. In food cutters, a receiving casing having a rearwardly extending tubular arm provided at its top with a longitudinal slot, a head mounted in the casing and movable axially of the same provided with a tubular neck operable in said arm, said neck being provided with a lug projecting through the slot of said arm, a sleeve rotatably mounted on said casing about said arm and provided with a helical groove of undulating configuration which receives the lug of said neck for imparting intermittent forward movement to the head when the sleeve is rotated, said groove having a straight portion crossing the body of the groove and so disposed as to permit return of the head to its initial position when said head has been moved into its most forward position, a valve plate rockably mounted at the intersection of the straight portion and the undulating portion of the groove, resilient means for normally holding said valve plate in parallelism with the straight portion of the groove so as to prevent entry of the lug of said neck into the undulating portion of the groove during the return of the head to its initial position, the effective length of the valve plate being such as to close the groove, cutting means mounted at the front of said casing, and means for operating said cutting means after each forward movement of the head when said sleeve is rotated.

In testimony whereof I affix my signature in presence of two witnesses.

FREDERICK HANUSCH.

Witnesses:
H. H. MARSLAND,
FRANK HANUSCH.